United States Patent [19]

Szulinski

[11] 4,410,802
[45] Oct. 18, 1983

[54] STORAGE DEPOT FOR RADIOACTIVE MATERIAL

[57] Inventor: Milton J. Szulinski, Richland, Wash.

[73] Assignee: The United States of America as represented by the U.S. Department of Energy, Washington, D.C.

[21] Appl. No.: 677,339

[22] Filed: Apr. 15, 1976

[51] Int. Cl.² ............................................. G21F 3/00
[52] U.S. Cl. ............................... 250/515.1; 250/506.1
[58] Field of Search ............... 250/253, 428, 432, 492, 250/493, 505, 506, 507, 514, 515, 517, 518; 176/19 LD, 87

[56] References Cited

U.S. PATENT DOCUMENTS

| | | | |
|---|---|---|---|
| 2,769,921 | 11/1956 | Nahin et al. | 250/253 |
| 3,073,961 | 1/1963 | Nachbar et al. | 250/507 |
| 3,124,687 | 3/1964 | Barton, Jr. | 250/492 R X |
| 3,934,152 | 1/1976 | Alleaume | 250/515 X |

*Primary Examiner*—Archie R. Borchelt

[57] ABSTRACT

Vertical drilling of cylindrical holes in the soil, and the lining of such holes, provides storage vaults called caissons. A guarded depot is provided with a plurality of such caissons covered by shielded closures preventing radiation from penetrating through any linear gap to the atmosphere. The heat generated by the radioactive material is dissipated through the vertical liner of the well into the adjacent soil and thus to the ground surface so that most of the heat from the radioactive material is dissipated into the atmosphere in a manner involving no significant amount of biologically harmful radiation. The passive cooling of the radioactive material without reliance upon pumps, personnel, or other factor which might fail, constitutes one of the most advantageous features of this system. Moreover this system is resistant to damage from tornadoes or earthquakes.

Hermetically sealed containers of radioactive material may be positioned in the caissons. Loading vehicles can travel throughout the depot to permit great flexibility of loading and unloading radioactive materials. Radioactive material can be shifted to a more closely spaced caisson after ageing sufficiently to generate much less heat. The quantity of material stored in a caisson is restricted by the average capacity for heat dissipation of the soil adjacent such caisson.

5 Claims, 4 Drawing Figures

U.S. Patent    Oct. 18, 1983    Sheet 1 of 2    4,410,802

STORAGE DEPOT FOR RADIOACTIVE MATERIAL

FIELD OF THE INVENTION

This invention relates to the retrievable storage of depleted fuel and/or fission products derived from reprocessing depleted fuel and/or other radioactive materials. Such storage is near the earth's surface with provision for achieving dissipating of heat at a cost which is manageable.

PRIOR ART

Boldt U.S. Pat. No. 3,828,197 recommends that a container about 1 foot in diameter and about 10 feet long be placed in a cast steel cask having 16 inch walls (about 45 inch diameter by 13 feet long) for storage of radioactive wastes for several decades until the heat dissipation rate is low enough to be tolerable by the subterranean surfaces of a cavern. The thick-walled cask radiates heat to the atmosphere, so that the Boldt system features the passive cooling so essential for long term storage of radioactive materials. The Boldt patent clarifies the problems of security, corrosion resistance, and ecological hazards of an area for atmospheric storage of radioactive waste. However, the cost of encapsulating radioactive waste in a cask having 16 inch steel walls has been high enough that there have been continuing efforts to achieve cheaper but acceptable storage for radioactive materials. Radioactive materials can be stored in a storage depot containing a plurality of the Boldt U.S. Pat. No. 3,828,197 casks, but the capital cost per ton of material subjected to the long term storage is disadvantageously great. As explained in "Peach Bottom Fuel Storage Facility" Report TID-4500 by J. D. Hammond et al., published June, 1971, a plurality of caissons can serve as storage vaults for depleted fuel from a high temperature gas cooled reactor.

Although there has been a long-standing demand for an adequate but inexpensive storage depot, there has been no adequate proposal for a simple, low maintenance system for having a storage depot for retrievable storage of radioactive materials.

SUMMARY OF THE INVENTION

In accordance with the present invention, a storage depot is designed to permit the inexpensive storage of radioactive material in such a manner that a significant portion of the heat generated by the radioactive material is dissipated to the atmosphere by reason of the conduction of heat through the soil to the surface of the ground and the conduction and radiation of heat from the ground surface to the atmosphere. Such heat dissipation from caissons is achieved by providing around each used caisson an area for heat dissipation sufficient to deal with the heat generated in such caisson. There is great flexibility concerning both the relative spacing of caissons about the depot and also the relative heat loading for any specific caisson. Each caisson is covered by a closure to assure the shielding of any radioactive radiation from the stored material to the zone above the caisson. Each closure is resistant to burglary so that unauthorized persons cannot readily tamper with the radioactive material. The storage depot permits significant flexibility in use of the caissons, which are far enough apart to assure passage of appropriate loading vehicles. Inexpensive retrieval of the material from a caisson is feasible in the storage depot. Overall costs and security are so attractive that the storage depot is attractive not merely for storage for months but also storage for decades.

DESCRIPTION OF GENERIC INVENTION

A storage depot is provided which assures the protection of radioactive material from danger from weather, earthquakes, vandalism, and/or other interference. Although there are advantages in locating the storage depot in an area in which the climate is generally arid, any isolated area which could be guarded would be suitable. The flow of the run-off from rain or other precipitation within the storage depot should be suitable for discharge into streams ordinarily. Such water run-off would be monitored as a part of the redundant precautions for rapid detection of unexpected emergencies.

Security systems are maintained so that the public is excluded from the storage depot and so that only the authorized personnel (guards and operators) concerned with loading and unloading casks will have access to the area. A series of caissons are dug in the storage depot and each caisson is provided with a liner, desirably a steel pipe. Refractory alumina, concrete, and other materials are also suitable as liners for some materials, but the material stored in a caisson must be selected to avoid exceeding the temperature limit for the liner. If the liner is steel, it may be an ordinary carbon steel, or it may be an alloy of iron and chromium adapted to withstand higher temperatures. The liner must be resistant to corrosion in view of the amount of precipitation, soil moisture, water table, soil acidity, and related variables affecting caissons in a particular area.

The caissons are far enough apart that in the event of an earthquake, there would be a propensity for any fissures to be in the area between caissons instead of in the smaller area corresponding to the storage zones of caissons. A typical spacing of caissons allocates many times more subterranean area for heat dissipation than to the subterranean area for storage. Whether such heat dissipation to storage ratio is 3 to 1 or 100 to 1 or more typically 16 to 1 is dependent upon the amount of heat to be dissipated from each caisson.

Each caisson is provided with a top closure such as a multi-stepped plug effectively shielding the atmosphere from direct radiation from the caisson contents. The total closure system is adapted to minimize the likelihood of tampering except in accordance with the schedules of the storage depot manager. A vertical extension of the caisson lining wall is not a satisfactory interface between the closure and the caisson. Vertical escape of radiation from the storage zone must be prevented by a closure area greater than the storage area. Moreover, the closure is multi-stepped so that a nonlinear (e.g. zigzag) boundary is established between the closure and its support. Because such boundary is nonlinear, no unshielded radiation from the storage zone can escape into the atmosphere. Ordinarily, the top of the stored radioactive material is far enough beneath the atmosphere that the lining and soil shield substantially all radiation except the nearly vertical radiation. A shielding device is desirably positioned in the caisson near the top of the cavity, and such shielding device is desirably deemed a part of the closure adapted to prevent vertical radiation from the caisson, and/or the gap between the closure and the caisson.

The soil between the caisson linings represents a large portion of the area of the storage depot, most of which is the native soil. In the storage depot, such soil between the closure becomes relatively warmer than it might be if the radioactive material were not generating heat. As the wind and other air currents pass in contact with the soil in the storage depot, much heat is conducted from the soil to the atmosphere. Moreover, the soil radiates heat into the atmosphere without having biologically dangerous gamma, beta, neutron, or alpha radiation. The heat of the radioactive material is dissipated into the atmosphere by reason of the heat conduction from the cask through the caisson lining into the subterranean soil and then to the surface soil with effective heat transfer from the surface soil to the atmosphere.

The engineering for the storage depot is based upon systems functioning automatically without need for significant supervision. As a further assurance of safe operation, facilities are available for periodic surveillance to confirm that all units are functioning as scheduled. Instrumentation access conducts, normally closed, but openable when safety inspectors are auditing the depot can permit thermometers, radiation meters, gas analyzers, etc. to be lowered temporarily into the gas zone of the storage zone of a caisson and removed there from after an inspector has made measurements. If desired a few caissons can be provided with sensors and with instrument communication lines leading to the control cabin of the storage depot. The cost-benefits factors tend to minimize the attractiveness of sophisticated instrumentation for a storage depot. The probability of failure in the instrumentation system appears generally to be greater than the probability of abnormal occurrence requiring the prompt attention of the personnel at the storage depot. The heat transfer capacity of the large area of soil between caissons is so great that there is only a small probability of difficulty with a caisson engineered storage depot system.

There is extreme flexibility relating to the loading and unloading of the storage caissons. The retrievability of the material at the surface storage site permits a container to be shifted from caisson to caisson to regularly store the container in a caisson spaced as closely to other caissons as appropriate in view of the heat dissipation engineering problems. Over a period of years, the heat output rate can decline. Caissons storing containers generating heat at a relatively low rate could sometimes be treated as almost equivalent to empty caissons in the engineering for heat dissipation, while still utilizing the radioactivity shielding of the caisson for inexpensive storage of the radioactive material.

By providing a storage depot in which a hermetically sealed container can be readily removed from storage and returned to a reprocessing plant without greatly increasing the cost of administering the storage depot, significant advantages are achieved in the system using such hermetically sealed containers. For example some caissons might contain alarm devices to assure prompt transfer to water cooled storage facilities if the temperature rise departed significantly from its scheduled pattern. Temperatures are expected to increase at a sufficiently slow rate that corrective action can readily be managed before high temperatures might disrupt the scheduled tranquility of the storage depot.

The storage depot is desirably adapted to permit storage of a plurality of containers having dimensions of the general magnitude of 1 foot in external diameter and 16 feet in length, suitable for encapsulating and hermetically sealing a bundle of depleted fuel rods removed from a light water reactor. Containers designed to hold fission products or other reprocessing wastes in the caissons would have dimensions intended to be suitable for storage of such materials for centuries instead of months.

Each caisson is deep enough to hold an upright container. The present invention features convenient loading and unloading of each container from a caisson, thus imposing a mandatory limit of a maximum of three containers about 16 feet high stacked upon each other as a tier in a caisson. A greater number of significantly shorter containers can be stacked in the storage cavity having a height of not more than about 50 feet.

Apparatus scheduled for scrapping can be stored in a caisson without encapsulation in a container if it is not generating toxic gases, the reference to containers being aimed at simplifying the operations of loading and unloading the radioactive material into and from a caisson. When storage depot status is terminated, all containers can be removed from all caissons.

The bottom of a caisson may be of the same sealing material as the sidewalls or of a different sealing material. In the storage of some materials in some areas, no bottom sealing is required because the soil serves adequately in delaying permeation of gases etc.

A shielding plug is utilized as a part of the closure for each caisson of the present invention. It should be noted that this important shielding plug must be independently removable and normally must be positioned just below the earth's surface in each caisson. Such shielding plug is deemed a part of the closure. The weight of the shielding plug is great enough that an average person cannot easily lift it from its closure position. Such shielding plug decreases the likelihood that unauthorized personnel might tamper with a caisson. The closure means includes a removable cover fitting on a rim of a collar at the upper opening of the caisson. Suitable locking connection means tending to decrease the likelihood of tampering by unauthorized personnel are employed to lock such removable cover to such collar. For example, the rim (anchored in the soil and to the liner) may have posts which can be connected to lugs on the closure. Such connection can be by bolts, welding, or other theft-resistant means. If desired, caissons can be hermetically sealed.

In the tiers of packages, containers of plutonium oxide could be stored between or below containers of highly radioactive wastes, thereby discouraging attempts to remove the containers of plutonium. Other approaches intended to permit safe transfers of containers by authorized personnel, but imposing biological risks for ignorant intruders, could be a part of the proprietary technological information of the administrators of the storage depot.

If depleted bundles of fuel rods generating heat at a rate of about 2.25 kilowatts are stored in shallow caissons spaced on a gridiron pattern with centers about ten meters apart, the surface midpoint of the soil between caissons is heated less than 1° C. because the heat radiation of the soil closer than said midpoint adequately dissipates such heat load.

Each caisson is equipped with an instrument access tube. At appropriate inspection intervals (e.g. 3 months) the instruments are lowered to measure various types of radiation, temperature, gas composition, and related variables. Detection of radioactive krypton would indicate that not only had a fuel rod leaked, but that the container had also leaked.

Present data suggest that it would be efficient to store bundles of depleted fuel rods under water in a more sophisticated storage facility for from about 2 to about 4 years before dry storage, and to expect the peak output of heat to be about a year after starting dry storage.

Advantages accrue from locating the storage depot at a fuel reprocessing plant.

A receiving facility could inventory and inspect fuel bundles, which could then be transferred to cylindrical containers (e.g. 16 inches diameter, 16 feet high) and hermetically sealed. A loading vehicle transfers the container to a suitable caisson, where it is lowered into place, the closure system is positioned, and the tamper-resistant locking effected.

DESCRIPTION OF PREFERRED EMBODIMENTS

Figure 1:
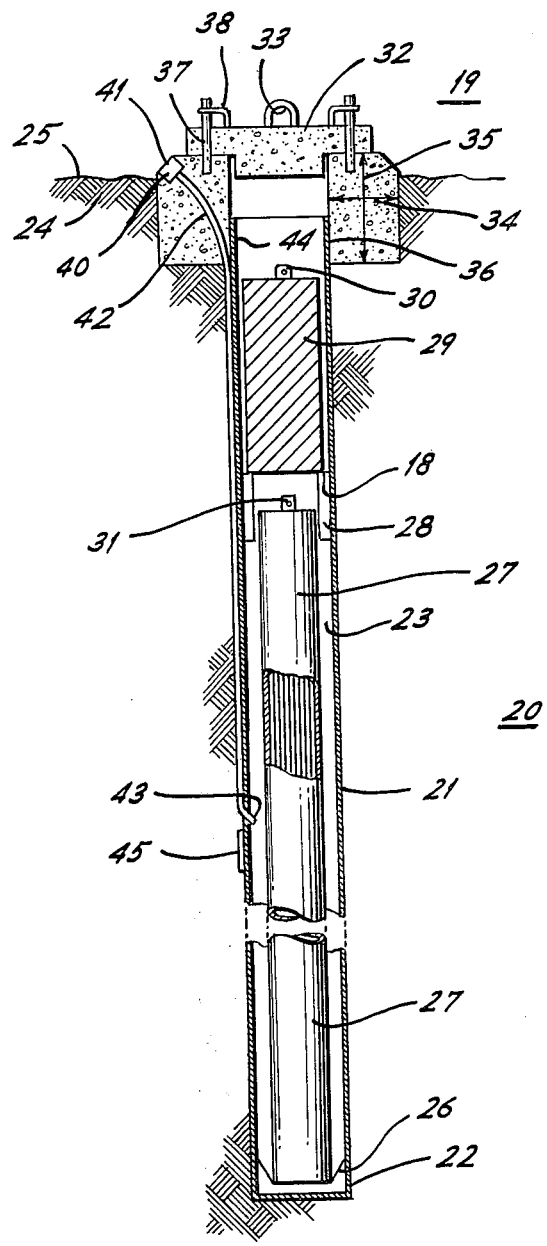
FIG. 1 is a schematic view of a storage caisson.

As shown in FIG. 1 a storage caisson 20 can include a liner 21 such as a 30 inch steel pipe extending vertically upward from a concrete foundation 22. Any heat generated in a storage cavity 23 above such foundation 22 is dissipated through the wall of liner 21 into soil 24 and such heat is conducted through the soil to the earth surface 25 in the area around the caisson 20. Any heat transmitted to earth surface 25 is dissipated to atmosphere 19. The cross sectional shape of a caisson 20 can be rectangular, square, octagonal, or otherwise but is ordinarily round because of the convenience of drilling round holes for the caisson. Centering devices 26 can guide the bottom of a container 27 toward the center of storage cavity 23. Centering devices 28 can guide the upper portion of container 27 toward the center of storage cavity 23.

Particular attention is called to a support 18 adapted to support a massive shield 29 having a weight sufficiently great that an average person cannot readily lift the shield 29 from caisson 20 without hoisting equipment. The shield 29 is provided with a J-tool lifting device 30 so that power hoist equipment can lift it from the caisson when authorized personnel are using power hoist equipment at the caisson 20. Similarly a J-tool lifting device 31 is provided for container 23. A lid 32 is provided with a lifting device 33.

Particular attention is directed to a collar 34 which is anchored in soil 24 adjacent caisson 20. Said collar has a depth 35 greater than its width 36 to assure adequate anchoring of the collar and to minimize the likelihood of yanking of the combination of the collar and lid from the soil by unauthorized personnel. Desirably said collar 34 is also anchored to an upper interior wall 44, which may be an upward continuation of said liner 21.

Appropriate locking means are provided for attaching the lid 32 to the collar 34. For example, standards 37 on collar 34 are suitable for securing to lugs 38 on lid 32 by U-bolts, welding, or other tamper-resistant locking means.

It should be especially noted that a monitor junction box 40 is provided in an above ground portion of collar 34. A closure 41 can normally close the opening of box 40. A conduit 42 extends from the monitor junction box 40 to a monitoring zone 43 in the storage cavity 23 of caisson 20. During occasional inspection of a caisson, a sensor for a measuring instrument can be directed by a cable through the conduit 42 into the monitoring zone 43. Thus it is feasible to measure the temperature, helium content, radioactive radiation and/or other characteristics of the storage cavity 23. A soil probe 45 sensitive to the temperature of soil 24 adjacent the monitoring zone 43 can be contacted for measuring the temperature of such adjacent soil.

In the utilization of a storage caisson 20 of FIG. 1, the soil 24 is initially drilled to provide a vertical hole into which a liner 21 such a steel pipe is inserted. A concrete grout is poured as foundation 22 and finished to provide the centering means 26. Centering means 28 and support 18 are positioned in liner 21. Conduit 42 and temperature probe 45 are also secured in place at an early stage in construction. Concrete collar 34 is cast so that its depth 35 is greater than its width 36, thereby assuring adequate anchoring in soil 24. The upper interior wall 44, which is the upper part of the pipe serving as liner 21, has an expansion joint associated with the concrete collar 34. The monitor junction box 40 is positioned in the collar. The cover 41 is attached to box 40.

A shield 29 is cast with concrete with a lifting hook 30. A concrete lid 32 is provided with a lifting hook 33 and with holes accommodating standards 37 extending upwardly from collar 34. Lugs 38 on lid 32 are adapted for connection to standards 37 by suitable locking means such as welding or U-bolts.

After the caisson 20 has been constructed, a container 27 can be lowered by its lifting hook into storage cavity 23. Thereafter the shield 29 can be lifted into place so that it rests on supports 18. The lid 32 is lifted into place and lugs 38 are secured to standards 37. After a container has been stored in the storage zone 23, its heat is transmitted through liner wall 21 to soil 24 to soil surface 25 and then to atmosphere 19, thus safely dissipating the heat to the atmosphere.

Figure 2:
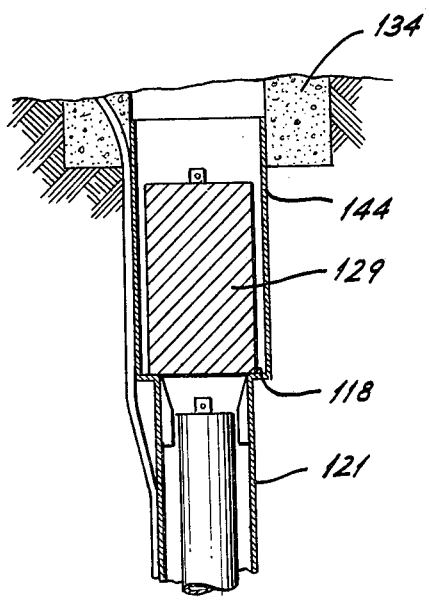
FIG. 2 is a schematic sectional view of an alternative embodiment of a storage caisson.

As shown in FIG. 2, an upper wall 144 can have a diameter larger than the storage zone liner 121 so that support 118 constitutes a ledge attributable to such differences in diameter. Shield 129 can have a diameter significantly greater than liner 121 and comfortably smaller than upper wall 144. Collar 134 can be cast sufficiently deep that it anchors to wall 144, and so that its depth is greater than its width.

Figure 3:
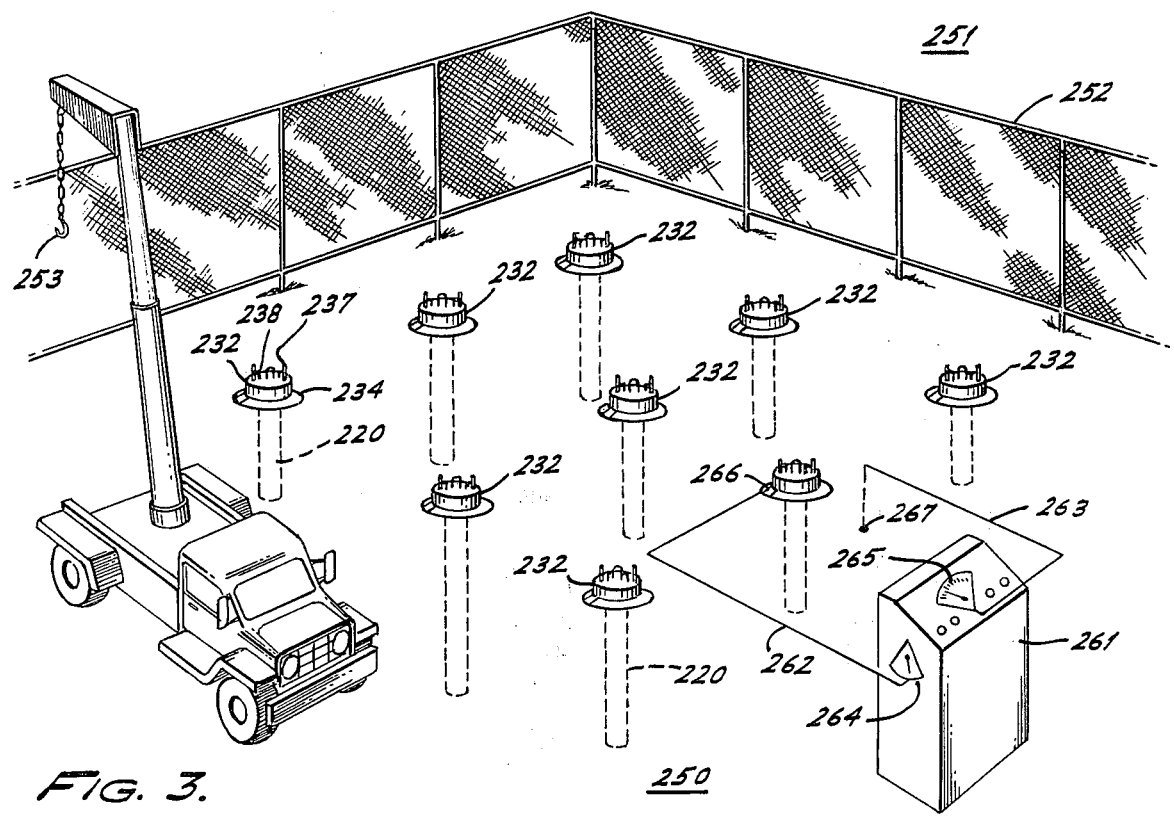
FIG. 3 is a schematic diagram of a storage depot featuring the use of storage caissons.

As shown in FIG. 3, a storage depot 250 embraces a considerable area of arid soil 251 enclosed by a suitable fence 252. Hoisting apparatus 253 can be shifted to various portions of storage depot 250. A plurality of storage caissons 220 penetrate soil 251 and are spaced sufficiently apart that soil 251 can dissipate the heat from storage caissons 220 to the atmosphere 219. A collar 234 has greater depth than width and sufficient depth to be well anchored in the soil 251. A lid 232 has lugs 238 which can be anchored to standards 237 extending from collar 234. A control cabin 261 has communication lines 262, 263 extending from measuring devices 264, 265, to sensors 266, 267, for detecting a characteristic such as temperature at zones close to and spaced from caissons 220. Most of the storage caissons 220 are not equipped with such sensors but do have the monitoring conduits so that periodic inspections are feasible.

Figure 4:
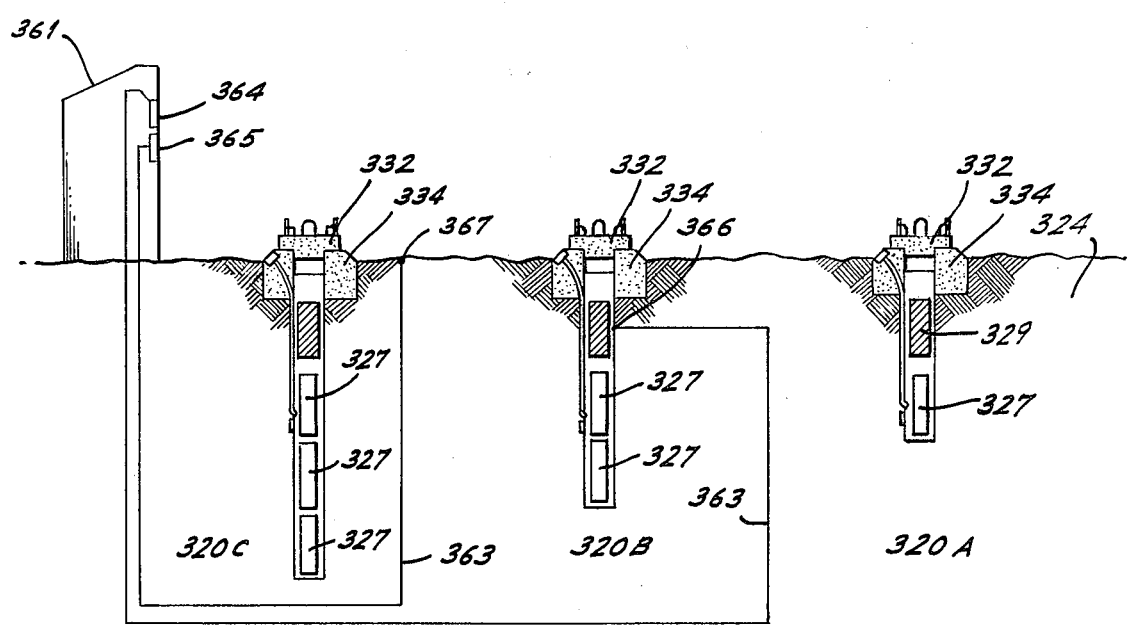
FIG. 4 is a schematic view of a cross section of a storage depot.

As shown in FIG. 4, a storage caisson 320A can be adapted for a single container 327. The caisson 320B has a depth to permit the storage of two containers 327. The caisson 320C has a depth suitable for the storage of three containers 327, each container being adapted to hermetically seal a group of depleted fuel rods from a light water reactor, such fuel rod container having a length (or height) of the general magnitude of 16 feet. Thus the storage zone of caisson 320C is nearly 50 feet in height so that the total depth of caisson 320C is more than 50 but generally less than 60 feet and assuredly less than 70 feet. A massive shield 329 absorbs any vertically directed radioactive radiation so that lid 332 can serve predominantly as a mechanical barrier. A monitoring conduit 342 permits the insertion of sensing probes into storage zone 323 during occasional inspections of most of the caissons. A few caissons, if desired, may have communication lines with a control cabin 361. Measuring instruments 364, 365, can be associated with sensors 366, 367, through conduits 362, 363.

Various modifications of the invention are possible without departing from the scope of the appended claims.

I claim:

1. A system for the storage of radioactive material, said system comprising a storage depot, security means restricting unauthorized entry to the storage depot, and a plurality of vertical storage caissons dug in the soil of said depot, each caisson having a removable closure lid thereover to permit surface access to such caisson for placement or retrieval of containers in such caisson by authorized personnel operating hoisting equipment, each caisson having a depth sufficient to accommodate in a storage cavity at least one but not more than three vertically stacked containers of a type accommodating vertically aligned depleted fuel rods from a light water reactor, a support at a level above said storage cavity for supporting a massive radiation shield, each caisson having a removable massive radiation shield resting on said support and above said storage cavity, said massive radiation shield having at least some portion of greater horizontal cross sectional area than the horizontal cross-sectional area of a container, said massive radiation shield being adapted to provide nonlinearity for any path between said container and the atmosphere whereby said massive radiation shield prevents linear escape of radioactive radiation from the radioactive material to the atmosphere, said massive radiation shield being heavier than could be readily lifted without hoisting equipment, each caisson having a liner extending from the caisson bottom to said support, a collar anchored at least partly beneath the soil adjacent said caisson, the collar extending to a depth greater than its width, an upper wall portion extending from the level of said support to the level of said collar, securing means for attaching said closure lid to said collar, said storage depot having said caissons spaced apart sufficiently to permit atmospheric dissipation of heat from said radioactive material by heat conduction through said liner and said soil to the soil surface between caissons and by dissipation of heat from such soil surface to the atmosphere.

2. The system of claim 1 in which said collar has a normally covered monitoring box connected by a conduit to a monitoring zone adjacent a middle level of the storage cavity.

3. The system of claim 1 in which centering means are provided at a plurality of levels for urging containers toward a coaxial alignment with the storage cavity.

4. The system of claim 1 in which said closure lid is a concrete lid supported by said collar said lid having lugs securable to standards extending from the collar through openings in said lid.

5. A system for the storage of radioactive material, said system comprising a storage depot, security means restricting unauthorized entry to the storage depot, and a plurality of vertical storage caissons dug in the soil of said depot, each caisson having a removable concrete closure lid thereover to permit surface access to such caisson for placement or retrieval of containers in such caisson by authorized personnel operating hoisting equipment, each caisson having a depth sufficient to accommodate in a storage cavity at least one but not more than three vertically stacked containers of a type accommodating vertically aligned depleted fuel rods from a light water reactor, a support at a level above said storage cavity for supporting a massive radiation shield, each caisson having a removable massive radiation shield resting on said support and above said storage cavity, said massive radiation shield having at least some portion of greater horizontal cross sectional area than the horizontal cross-sectional area of a container, said massive radiation shield being adapted to provide nonlinearity for any path between said container and the atmosphere whereby said massive radiation shield prevents linear escape of vertically oriented radioactive radiation from the radioactive material to the atmosphere, said massive radiation shield being heavier than could be readily lifted without hoisting equipment, each caisson having a liner extending from the caisson bottom to said support, a concrete collar anchored at least partly beneath the soil adjacent said caisson, the collar extending to a depth greater than its width, a normally covered monitoring box in said collar, said monitoring box being connected by a conduit to a monitoring zone adjacent a middle level of the storage cavity, an upper wall portion extending from the level of said support to the level of said collar, standards extending from said collar through openings in said concrete lid, lugs on said lid said lugs being securable to said standards, said storage cavity having at a plurality of levels centering means urging containers toward a coaxial alignment with said storage cavity, said storage depot having said caissons spaced apart sufficiently to permit atmospheric dissipation of heat from said radioactive material by heat conduction through said liner and said soil to the soil surface between caissons and by dissipation of heat from such soil surface to the atmosphere.

* * * * *